(12) United States Patent
Kim et al.

(10) Patent No.: US 12,425,135 B2
(45) Date of Patent: Sep. 23, 2025

(54) METHOD AND DEVICE FOR REPETITIVELY TRANSMITTING UPLINK CHANNEL IN WIRELESS COMMUNICATION SYSTEM

(71) Applicant: Samsung Electronics Co., Ltd., Suwon-si (KR)

(72) Inventors: Youngbum Kim, Suwon-si (KR); Jinkyu Kang, Suwon-si (KR); Hyunseok Ryu, Suwon-si (KR); Jeongho Yeo, Suwon-si (KR); Seunghoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 290 days.

(21) Appl. No.: 18/007,967

(22) PCT Filed: Jun. 7, 2021

(86) PCT No.: PCT/KR2021/007100
§ 371 (c)(1),
(2) Date: Dec. 2, 2022

(87) PCT Pub. No.: WO2021/246845
PCT Pub. Date: Dec. 9, 2021

(65) Prior Publication Data
US 2023/0261796 A1    Aug. 17, 2023

(30) Foreign Application Priority Data
Jun. 5, 2020    (KR) .................. 10-2020-0068529

(51) Int. Cl.
*H04L 1/1607*    (2023.01)
*H04L 1/08*    (2006.01)

(52) U.S. Cl.
CPC .............. *H04L 1/1642* (2013.01); *H04L 1/08* (2013.01)

(58) Field of Classification Search
CPC ....... H04L 1/1642; H04L 1/08; H04L 1/1819; H04L 1/1896; H04L 5/0094;
(Continued)

(56) References Cited

U.S. PATENT DOCUMENTS 8,667,357 B2    3/2014  Park
9,844,036 B2   12/2017  Seo et al.
(Continued)

FOREIGN PATENT DOCUMENTS

KR    10-2009-0078749 A    7/2009
KR      10-1548744 B1       9/2015
(Continued)

OTHER PUBLICATIONS

ETSI; 5G; NR; Physical layer procedures for data (3GPP TS 38.214 version 15.2.0 Release 15); ETSI TS 138 214; V15.2.0; Jul. 31, 2018; Sophia Antipolis Cedex, France.
(Continued)

*Primary Examiner* — Yu-Wen Chang
(74) *Attorney, Agent, or Firm* — Jefferson IP Law, LLP

(57) ABSTRACT

An operating method of a terminal in a wireless communication system may include receiving, from a base station, configuration information for repetitive transmissions of uplink data, based on the configuration information, determining a redundancy value (RV) value of the uplink data, and transmitting the uplink data based on the RV value, wherein the determining of the RV value may include determining the RV value by comparing a number of symbols configured by the base station with a number of symbols used for the repetitive transmissions of the uplink data.

14 Claims, 9 Drawing Sheets

(58) Field of Classification Search
CPC ... H04L 5/0044; H04L 5/0078; H04L 1/0023; H04L 5/0007; H04W 72/1268; H04W 72/046; Y02D 30/70
See application file for complete search history.

(56) References Cited

U.S. PATENT DOCUMENTS

| | | | |
|---|---|---|---|
| 10,368,363 | B2 | 7/2019 | Park et al. |
| 11,464,033 | B2 | 10/2022 | Bae et al. |
| 2020/0146034 | A1 | 5/2020 | Bagheri et al. |
| 2020/0412492 | A1* | 12/2020 | Oh .......................... H04L 1/189 |
| 2022/0123865 | A1* | 4/2022 | Sridharan ............. H04L 5/0053 |
| 2022/0231789 | A1* | 7/2022 | Ying ....................... H04L 1/189 |

FOREIGN PATENT DOCUMENTS

| | | |
|---|---|---|
| KR | 10-1948901 B1 | 2/2019 |
| WO | 2009/145474 A2 | 12/2009 |
| WO | 2014/107030 A1 | 7/2014 |
| WO | 2016/167623 A1 | 10/2016 |

OTHER PUBLICATIONS

International Search Report with Written Opinion and English translation dated Aug. 30, 2021; International Appln. No. PCT/KR2021/007100.
Ericsson; Configured Grant Enhancement; 3GPP TSG-RAN WG1 Meeting #100bis-e; R1-2002034; XP 52342110A; Online; Apr. 20-30, 2020.
Extended European Search Report dated Oct. 30, 2023; European Appln. No. 21816839.1-1206 / 4156573 PCT/KR2021007100.
Korean Office Action dated Mar. 4, 2025, issued in Korean Patent Application No. 10-2020-0068529.
European Office Action dated Jun. 26, 2025, issued in European Patent Application No. 21816839.1.

* cited by examiner

METHOD AND DEVICE FOR REPETITIVELY TRANSMITTING UPLINK CHANNEL IN WIRELESS COMMUNICATION SYSTEM

TECHNICAL FIELD

The disclosure provides a method of repetitively transmitting an uplink channel in a wireless communication system.

BACKGROUND ART

In order to meet the increasing demand with respect to wireless data traffic after the commercialization of $4^{th}$ generation (4G) communication systems, efforts have been made to develop enhanced $5^{th}$ generation (5G) communication systems or pre-5G communication systems. For this reason, 5G communication systems or pre-5G communication systems are called as beyond 4G network communication systems or post long-term evolution (LTE) systems.

In order to increase a data rate, consideration is given to implementing 5G communication systems in ultra-high frequency (millimeter-wave (mmWave)) bands, e.g., 60 GHz bands. To reduce path loss of radio waves and increase a transmission range of radio waves in the ultra-high frequency bands, beamforming, massive multiple-input multiple-output (MIMO), full dimensional MIMO (FD-MIMO), array antenna, analog beamforming, and large-scale antenna techniques are under discussion.

To improve system network performance, technologies for advanced small cells, cloud radio access networks (RANs), ultra-dense networks, device to device (D2D) communication, wireless backhaul, moving networks, cooperative communication, coordinated multi-points (COMP), received-interference cancellation and the like have also been developed in the 5G communication systems. In addition, in 5G systems, an advanced coding modulation (ACM) method, e.g., hybrid frequency-shift keying (FSK) and quadrature amplitude modulation (QAM) (FQAM), sliding window superposition coding (SWSC), and advanced access technology, e.g., filter bank multi carrier (FBMC), non-orthogonal multiple access (NOMA), and sparse code multiple access (SCMA), have been developed.

The Internet has evolved from a human-centered connection network, through which humans generate and consume information, to an Internet of things (IoT) network that exchanges and processes information between distributed components, such as objects. Internet of everything (IoE) technology in which big data processing technology via a connection with a cloud server or the like is combined with the IoT technology has also emerged. To implement the IoT, various technological elements, such as sensing technology, wired/wireless communication and network infrastructures, service interface technology, and security technology, are required, such that, in recent years, technologies related to sensor networks for connecting objects, machine-to-machine (M2M) communication, and machine-type communication (MTC) have been studied. In the IoT environment, intelligent Internet (or information) technology (IT) services may be provided to collect and analyze data obtained from objects connected to each other to create new value in human life. The IoT may be applied to fields, such as smart homes, smart buildings, smart cities, smart cars or connected cars, smart grids, health care, smart home appliances, and advanced medical services, through convergence and integration of existing IT and various industries.

In this regard, various attempts to apply the 5G communication systems to the IoT network have been made. For example, technologies regarding sensor network, M2M, MTC, etc., are implemented by the 5G communication technologies, such as beamforming, MIMO, and array antennas. The application of a cloud RAN as big data processing technology may also be considered as an example of convergence between 5G technology and IoT technology.

As described above, various services may be provided due to the development of wireless communication systems, and thus, there is a need for methods of seamlessly providing such services.

DISCLOSURE

Technical Problem

The disclosure provides a method and apparatus for repetitively transmitting an uplink channel in a wireless communication system. In detail, the disclosure provides a method and apparatus of a base station or a terminal for configuring repetitive transmissions of an uplink channel suitable for a transmission environment.

Technical Solution

According to an embodiment of the disclosure, an operating method of a terminal in a wireless communication system may include receiving, from a base station, configuration information for repetitive transmissions of uplink data, based on the configuration information, determining a redundancy value (RV) value of the uplink data, and transmitting the uplink data based on the RV value, wherein the determining of the RV value may include determining the RV value by comparing a number of symbols configured by the base station with a number of symbols used for the repetitive transmissions of the uplink data.

An RV value of uplink data corresponding to an n-th transmission among the repetitive transmissions may be Mod $(n-N_{start}, N_{length})+1$, the $N_{length}$ may be a length of an RV sequence, and the $N_{start}$ may be a transmission index of uplink data corresponding to a first pattern among RV patterns applied to the repetitive transmissions.

The $N_{start}$ may be determined as a transmission index of uplink data in which the number of symbols configured by the base station is equal to the number of symbols used for the repetitive transmissions of the uplink data.

When there is no uplink data in which the number of symbols configured by the base station is equal to the number of symbols used for the repetitive transmissions of the uplink data, the $N_{start}$ nay be configured to 1.

When there is no uplink data in which the number of symbols configured by the base station is equal to the number of symbols used for the repetitive transmissions of the uplink data, all RV values of the uplink data may be configured to 0.

The $N_{start}$ may be determined as a transmission index of uplink data which first satisfies that a number of symbols used for the uplink data is greater than or equal to 1/m of the number of symbols configured by the base station.

When there is no uplink data which satisfies that the number of symbols used for the uplink data is greater than or equal to 1/m of the number of symbols configured by the base station, all RV values of the uplink data may be configured to 0.

According to an embodiment of the disclosure, a terminal in a wireless communication system may include a transceiver, and at least one processor, wherein the at least one processor may be configured to receive, from a base station, configuration information for repetitive transmissions of uplink data, based on the configuration information, determine a redundancy value (RV) value of the uplink data, and transmit the uplink data based on the RV value, and the at least one processor may be further configured to determine the RV value by comparing a number of symbols configured by the base station with a number of symbols used for repetitive transmissions of the uplink data.

According to an embodiment of the disclosure, an operating method of a base station in a wireless communication system may include transmitting, to a terminal, configuration information for repetitive transmissions of uplink data, and receiving the uplink data based on a redundancy value (RV) value, wherein the RV value of the uplink data may be determined based on the configuration information, and the RV value may be determined by comparing a number of symbols configured by the base station with a number of symbols used for repetitive transmissions of the uplink data.

Advantageous Effects

According to an embodiment of the disclosure, there is provided a method of determining valid resources for repetitive transmissions or receptions through a method by which a base station or a terminal configures repetitive transmissions of an uplink channel suitable for a transmission environment, and accordingly performing uplink transmission or reception, such that transmission or reception performance of the uplink channel may be increased.

MODE FOR INVENTION

Figure 1:
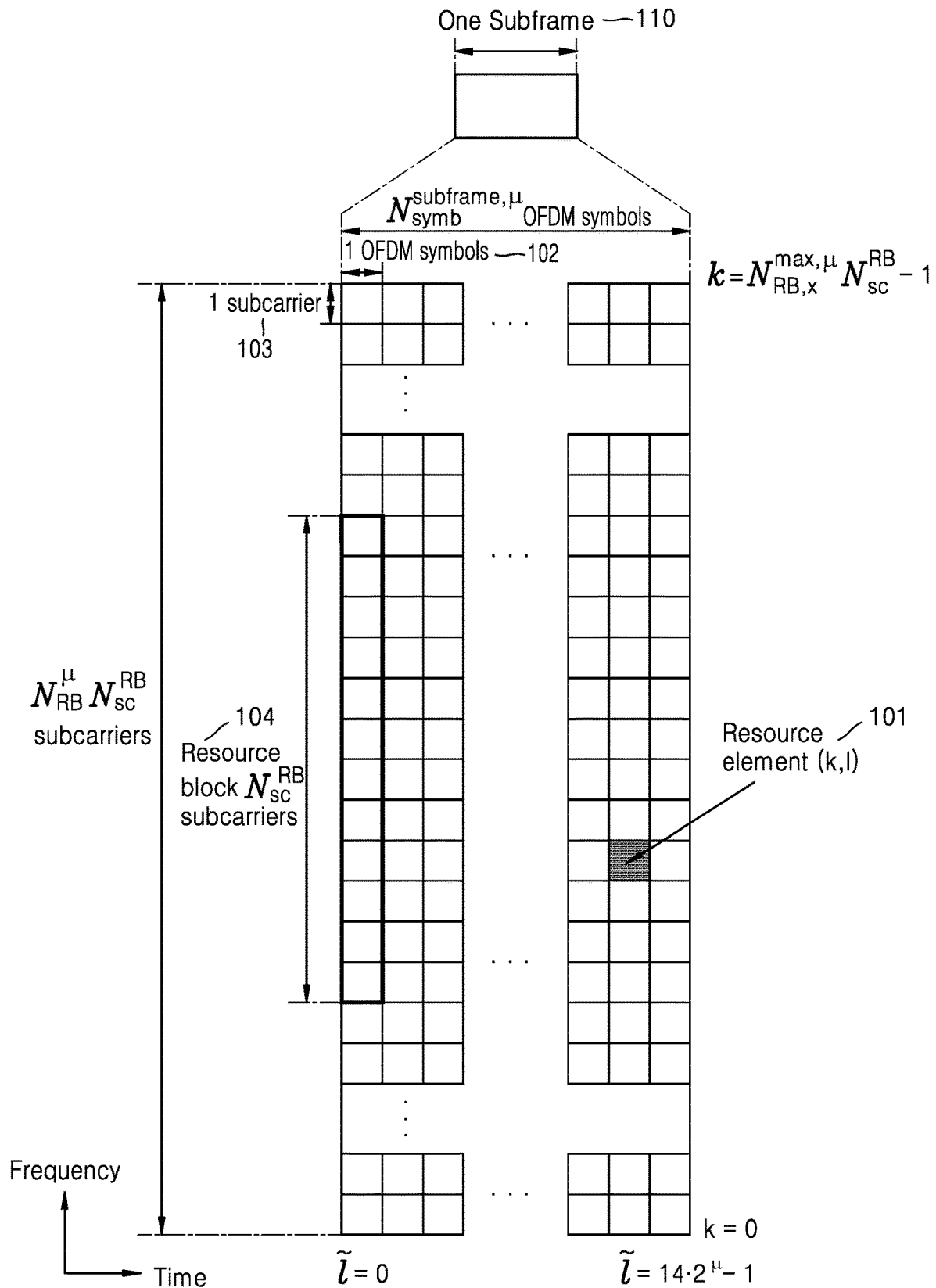
FIG. 1 is a diagram illustrating a basic structure of a time-frequency domain that is a radio resource domain in which data or a control channel is transmitted in a 5th generation (5G) or new radio (NR) system.

Embodiments of the disclosure will be described in detail with reference to accompanying drawings. Also, in the following descriptions of embodiments of the disclosure, descriptions of techniques that are well known in the art and are not directly related to the disclosure are omitted. This is to further clearly convey the gist of the disclosure without obscuring the gist of the disclosure by omitting an unnecessary description.

For the same reasons, some components may be exaggerated, omitted, or schematically illustrated in the accompanying drawings. Also, the size of each component does not entirely reflect the actual size. In each drawing, components that are the same or are in correspondence are rendered the same reference numeral.

The advantages and features of the disclosure and methods of achieving them will become apparent with reference to embodiments of the disclosure described in detail below with reference to the accompanying drawings. The disclosure may, however, be embodied in many different forms and should not be construed as being limited to the embodiments described herein; rather, these embodiments are provided so that the disclosure will be thorough and complete, and will fully convey the scope of the technical idea of the disclosure to those of ordinary skill in the art. The scope of the disclosure is only defined in the claims. In the specification, the same components are denoted by the same reference numerals. In the description of the disclosure, when it is determined that detailed descriptions of related functions or configurations may unnecessarily obscure the gist of the disclosure, the detailed descriptions will be omitted. The terms used in the specification are defined in consideration of functions used in the disclosure, and may be changed according to the intent or commonly used methods of users or operators. Accordingly, definitions of the terms will be understood based on the entire descriptions of the specification.

Hereinafter, the term base station (BS) refers to an entity for allocating resources to a terminal and may be used interchangeably with at least one of a next-generation node B (gNode B), an evolved node B (eNode B), a node B, a BS, a wireless access unit, a BS controller, or a node over a network. Examples of a terminal may include a user equipment (UE), a mobile station (MS), a cellular phone, a smartphone, a computer, and a multimedia system capable of performing a communication function. In the disclosure, a downlink (DL) denotes a wireless transmission path of a signal transmitted by a BS to a UE, and an uplink (UL) denotes a wireless transmission path of a signal transmitted by a UE to a BS. Also, embodiments of the disclosure will be described below on the basis of a long term evolution (LTE) or LTE-advanced (LTE-A) system, but may also be applied to other communication systems having similar technical backgrounds or channel types. Examples thereof may include 5th generation (5G) mobile communication technologies (e.g., 5G, new radio (NR), etc.) developed after LTE-A. 5G may be a concept including existing LTE, LTE-A, and other similar services. In addition, the disclosure is applicable to other communication systems through modification at the discretion of those of ordinary skill in the art without greatly departing from the scope of the disclosure.

In this regard, it will be understood that combinations of blocks in flowcharts or process flow diagrams may be performed by computer program instructions. Because these computer program instructions may be loaded into a processor of a general-purpose computer, a special purpose computer, or another programmable data processing device, the instructions, which are executed via the processor of the computer or the other programmable data processing device generate means for implementing functions specified in the flowchart block(s). Because these computer program instructions may also be stored in a computer-usable or computer-readable memory that may direct a computer or another programmable data processing device to function in a particular manner, the instructions stored in the computer-usable or computer-readable memory may produce an article of manufacture including instruction means that implement the functions specified in the flowchart block(s). Because the computer program instructions may also be loaded onto a computer or another programmable data processing device, a series of operational steps may be performed on the computer or the other programmable data processing device to produce a computer-implemented process, and thus the instructions executed on the computer or the other programmable data processing device may provide steps for implementing the functions specified in the flowchart block(s).

In addition, each block of the flowchart illustrations may represent a module, a segment, or a portion of code, which includes one or more executable instructions for performing specified logical function(s). It should also be noted that in some alternative implementations, the functions noted in the blocks may occur out of the order. For example, two successive blocks may be performed substantially at the same time or in reverse order, depending upon the functionality involved.

The term ' . . . er/or' as used in the present embodiment refers to a software or hardware component, such as field programmable gate array (FPGA) or application specific integrated circuit (ASIC), which performs some functions. However, the term ' . . . er/or' is not limited to software or hardware. The term ' . . . er/or' may be configured in an addressable storage medium or may be configured to reproduce one or more processors. Thus, for example, the term ' . . . ers/ors' may refer to components, such as software components, object-oriented software components, class components, and task components, and may include processes, functions, attributes, procedures, subroutines, segments of program code, drivers, firmware, microcode, circuits, data, a database, data structures, tables, arrays, and variables. The functionality provided in components and ' . . . ers/ors' may be combined into fewer components and ' . . . ers/ors' or may be further separated into additional components and ' . . . ers/ors'. Further, the components and ' . . . ers/ors' may be implemented to operate one or more central processing units (CPUs) in a device or a secure multimedia card. Also, according to an embodiment, a ' . . . er/or' may include one or more processors.

Hereinafter, embodiments of the disclosure will be described in detail with reference to the accompanying drawings. Hereinafter, according to an embodiment of the disclosure, an embodiment for improving physical uplink shared channel (PUSCH) coverage will be described, but the embodiment is not limited to each embodiment, and may also be used in a method of configuring RV values according to time/frequency resources corresponding to different channels and repetitive transmission types by using a combination of all or some of one or more embodiments set forth in the disclosure. Thus, the embodiments of the disclosure are applicable through modification at the discretion of those of ordinary skill in the art without greatly departing from the scope of the disclosure.

In the description of the disclosure, when it is determined that detailed descriptions of related functions or configurations may unnecessarily obscure the gist of the disclosure, the detailed descriptions will be omitted. The terms used in the specification are defined in consideration of functions used in the disclosure, and may be changed according to the intent or commonly used methods of users or operators. Accordingly, definitions of the terms are understood based on the entire descriptions of the specification.

A wireless communication system has evolved from a system providing voice-oriented services to a broadband wireless communication system providing high speed high quality packet data services of communication standards, such as high speed packet access (HSPA), LTE or evolved universal terrestrial radio access (E-UTRA), LTE-A, and LTE-Pro of 3rd generation partnership project (3GPP), high rate packet data (HRPD) and ultra-mobile broadband (UMB) of 3GPP2, and IEEE 802.16e.

In an LTE system as a representative example of the broadband wireless communication system, an orthogonal frequency division multiplexing (OFDM) scheme is employed in a DL, and a single carrier frequency division multiple access (SC-FDMA) scheme is employed in a UL. The UL refers to a radio link for a UE or MS to transmit data or a control signal to an eNode B or BS, and the DL refers to a radio link for a BS to transmit data or a control signal to a UE or MS. Also, in the multiple access scheme as described above, data or control information regarding each user is identified by performing allocation and operation so that time-frequency resources for carrying data or control information for each user do not overlap each other, that is, orthogonality therebetween is established.

A 5G communication system, as a post-LTE system, needs to support services capable of simultaneously satisfying various requirements to freely reflect various requirements of users, service providers, and the like. Services considered for the 5G communication system include enhanced mobile broadband (eMBB), massive machine type communication (mMTC), ultra-reliability low latency communication (URLLC), etc.

eMBB aims to provide a data rate that is higher than a data rate supported by legacy LTE, LTE-A, or LTE-Pro. For example, in the 5G communication system, eMBB needs to be able to provide a peak data rate of 20 Gbps in a DL and a peak data rate of 10 Gbps in an UL at one BS. Also, the 5G communication system needs to provide a peak data rate and simultaneously provide an increased user perceived data rate of the UE. In order to satisfy such requirements, there may be a need to improve various transmission and reception technologies including a more advanced multi-input multi-output (MIMO) transmission technology. While the LTE system uses up to 20 MHz transmission bandwidth in a 2 GHz band for signal transmission, the 5G communication system may use a frequency bandwidth wider than 20 MHz in 3 GHz to 6 GHz frequency bands or in 6 GHz or higher frequency bands. Therefore, the data rate required by the 5G communication system may be satisfied.

At the same time, mMTC is under consideration so as to support application services such as Internet of things (IoT) in the 5G communication system. In order to efficiently provide IoT, mMTC needs to support access of a massive UE in a cell, enhance coverage of the UE, increase battery time, and reduce costs of the UE. The IoT needs to be able to support a large number of UEs (e.g., 1,000,000 UEs/km$^2$) in a cell because it is attached to various sensors and various devices to provide communication functions. Also, because a UE supporting mMTC is likely to be located in a shadow region failing to be covered by the cell, such as the basement of a building, due to the characteristics of the service, the UE requires wider coverage than other services provided by the 5G communication system. The UE supporting mMTC needs to be configured as a low-cost UE and requires a very long battery life time such as 10 to 15 years because it is difficult to frequently replace the battery of the UE.

Finally, URLLC is a cellular-based wireless communication service used for a particular purpose (mission-critical). For example, URLLC may be used for services in remote control for robots or machinery, industrial automation, unmanned aerial vehicles, remote health care, emergency alerts, or the like. Therefore, communication provided by URLLC has to provide very low latency and very high reliability. For example, services supporting URLLC need to meet an air interface latency of less than 0.5 milliseconds and may simultaneously satisfy a requirement of a packet error rate equal to or lower than 10-5. Therefore, for services supporting URLLC, the 5G system needs to provide a smaller transmit time interval (TTI) than other services and may simultaneously has to allocate a wide resource in a frequency band so as to ensure reliability of a communication link.

Three services of the 5G communication system (hereinafter interchangeable with the 5G system), i.e., eMBB, URLLC, and mMTC, may be multiplexed and transmitted in a single system. In order to satisfy different requirements of the services, different transmission and reception schemes and different transmission and reception parameters may be used for the services.

A frame structure in a 5G system will now be described in more detail with reference to the accompanying drawings.

FIG. 1 is a diagram illustrating a basic structure of a time-frequency domain that is a radio resource domain in which data or a control channel is transmitted in a 5G or NR system.

In FIG. 1, a horizontal axis indicates a time domain, and a vertical axis indicates a frequency domain. A basic resource unit in the time and frequency domains is a resource element (RE) 101, which may be defined as one OFDM symbol 102 (or discrete Fourier transform spread OFDM (DFT-s-OFDM) symbol) on a time axis, and SC one subcarrier 103 on a frequency axis. In the frequency domain, $N_{sc}^{RB}$ (e.g., 12) consecutive REs may constitute one resource block (RB) 104. Also, in the time domain, $N_{symb}^{subframe}$ consecutive OFDM symbols may constitute one subframe 110.

Figure 2:
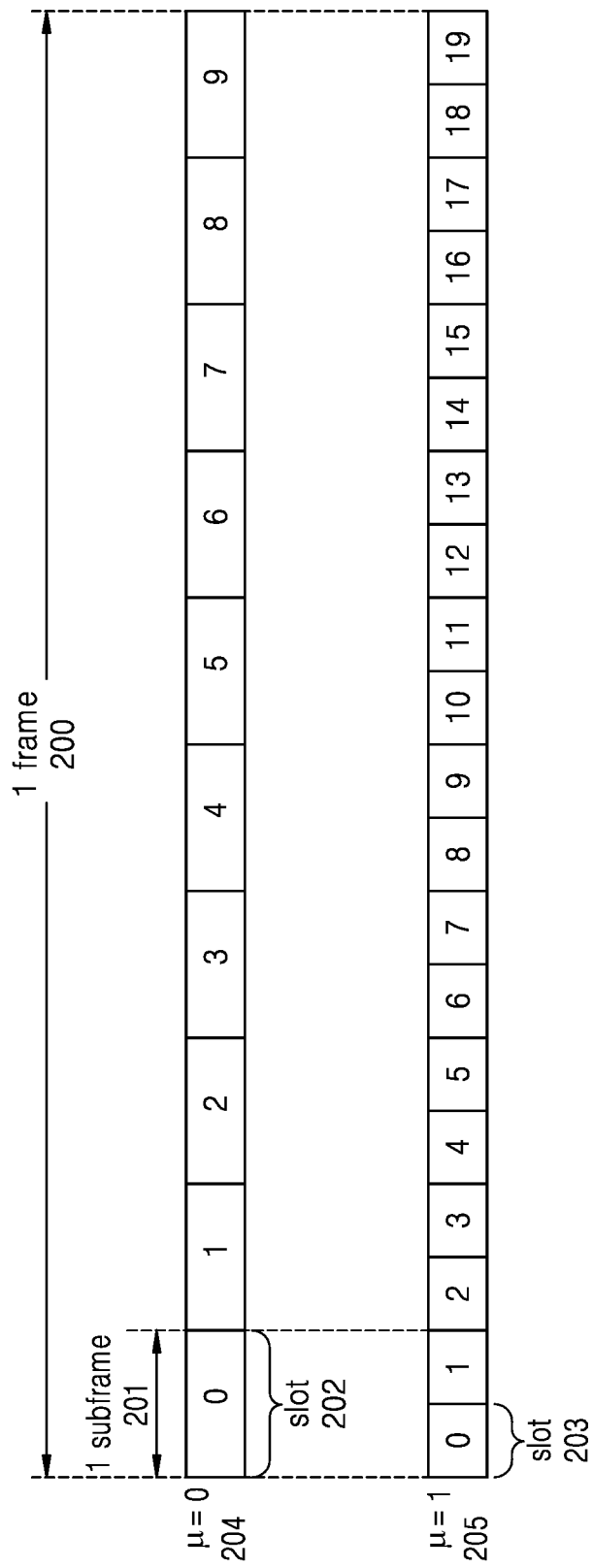
FIG. 2 is a diagram illustrating a slot structure considered in a 5G or NR system.

FIG. 2 is a diagram illustrating a slot structure considered in the 5G or NR system.

FIG. 2 illustrates an example of a structure of a frame 200, a subframe 201, and a slot 202. One frame 200 may be defined to be 10 ms. One subframe 201 may be defined to be 1 ms, and thus, a total of 10 subframes 201 may constitute one frame 200. Also, one slot 202 or 203 may be defined to have 14 OFDM symbols (i.e., the number $N_{symb}^{slot}$ of symbols per slot=14). One subframe 201 may include one or N slot more slots 202 and 203, and the number of slots 202 and 203 per one subframe 201 may vary according to subcarrier spacing (SCS) configuration values u 204 and 205.

In the example of FIG. 2, a slot structure when μ=0 (204) and μ=1 (205) as the SCS configuration values is illustrated. When μ=0 (204), one subframe 201 may include one slot 202, and when μ=1 (205), one subframe 201 may include two slots 203. That is, according to the SCS configuration value μ, the number ($N_{slot}^{subframe,\mu}$) of slots per one subframe may vary, and the number ($N_{slot}^{frame,\mu}$) of slots per one frame may vary accordingly. $N_{slot}^{subframe,\mu}$ and $N_{slot}^{frame,\mu}$ according to each SCS configuration u may be defined in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

A method of allocating a time domain resource for a data channel in the 5G communication system is now be described below.

The BS may configure, for the UE, a table related to time domain resource allocation information for a physical downlink shared channel (PDSCH) and a PUSCH, via higher layer signaling (e.g., RRC signaling). For the PDSCH, a table including up to 16 (maxNrofDL-Allocations=16) entries may be configured, and for the PUSCH, a table including up to 16 (maxNrofUL-Allocations=16) entries may be configured. The time domain resource allocation information may include, e.g., a PDCCH-to-PDSCH slot timing (corresponding to a time interval in a slot unit between a time point when a PDCCH is received and a time point when a PDSCH scheduled by the received PDCCH is transmitted, indicated by K0), or a PDCCH-to-PUSCH slot timing (corresponding to a time interval in a slot unit between a time point when the PDCCH is received and a time point when a PUSCH scheduled by the received PDCCH is transmitted, indicated by K2), information about a location and length of a start symbol where the PDSCH or the PUSCH is scheduled within a slot, and a mapping type of the PDSCH or the PUSCH. For example, the BS may notify the UE of pieces of information as shown in the following tables.

TABLE 2

```
PDSCH-TimeDomainResourceAllocationList information element
PDSCH-TimeDomainResourceAllocationList    ::=    SEQUENCE
(SIZE(1..maxNrofDL-Allocations)) OF PDSCH-TimeDomainResourceAllocation
PDSCH-TimeDomainResourceAllocation ::=    SEQUENCE {
    k0              INTEGER(0..32)            OPTIONAL,  -- Need S
    (PDCCH-to-PDSCH timing, slot unit)
    mappingType          ENUMERATED {typeA, typeB},
    (PDSCH mapping type)
    startSymbolAndLength      INTEGER (0..127)
    (start symbol and length of PDSCH)
}
```

TABLE 3

```
       PUSCH-TimeDomainResourceAllocation information element
PUSCH-TimeDomainResourceAllocationList ::=          SEQUENCE
(SIZE(1..maxNrofUL-Allocations)) OF PUSCH-TimeDomainResourceAllocation
PUSCH-TimeDomainResourceAllocation ::=      SEQUENCE {
   k2                 INTEGER(0..32)                  OPTIONAL,   -- Need S
   (PDCCH-to-PUSCH timing, slot unit)
   mappingType            ENUMERATED {typeA, typeB},
   (PUSCH mapping type)
   startSymbolAndLength       INTEGER(0..127)
   (start symbol and length of PUSCH)
}
```

The BS may notify the UE of at least one of the entries in the table about the time domain resource allocation information via L1 signaling (e.g., DCI, especially indicated by a 'time domain resource allocation' field in the DCI). The UE may obtain the time domain resource allocation information for the PDSCH or the PUSCH, based on the DCI received from the BS.

Hereinafter, repetitive transmissions of the PUSCH in the 5G system will be described in detail.

The 5G system supports two types of UL data channel repetitive transmission method, i.e., a PUSCH repetitive transmission type A and a PUSCH repetitive transmission type B.

PUSCH Repetitive Transmission Type A

As described above, a length and a start symbol of a UL data channel may be determined in a time domain resource allocation method within one slot, and the BS may notify the UE of the number of repetitive transmissions via higher layer signaling (e.g., RRC signaling) or L1 signaling (e.g., DCI).

The UE may repetitively transmit, in consecutive slots, UL data channels having the same length and start symbol of the UL data channel configured on the basis of the number of repetitive transmissions received from the BS. In this case, when at least one symbol among symbols of a slot that is configured for the UE as DL by the BS or a UL data channel that is configured for the UE is configured as DL, the UE skips transmission of the UL data channel. That is, though the transmission is included in the number of repetitive transmissions of the UL data channel, the UE does not transmit the UL data channel.

PUSCH Repetitive Transmission Type B

As described above, a length and a start symbol of a UL data channel may be determined in a time domain resource allocation method within one slot, and the BS may notify the UE of the number of repetitive transmissions, numberofrepetitions, via higher layer signaling (e.g., RRC signaling) or L1 signaling (e.g., DCI).

Based on the length and start symbol of the UL data channel configured earlier, nominal repetition of the UL data channel is determined as follows. A slot in which an n-th nominal repetition starts is given by $$K_s + \left\lfloor \frac{S + n \cdot L}{N_{symb}^{slot}} \right\rfloor,$$

and a start symbol in the slot is given by $\mathrm{mod}(S+n \cdot L, N_{symb}^{slot})$. A slot in which the n-th nominal repetition ends is given by $$K_s + \left\lfloor \frac{S + (n+1) \cdot L - 1}{N_{symb}^{slot}} \right\rfloor,$$

and an end symbol in the slot is given by $\mathrm{mod}(S+(n+1) \cdot L-1, N_{symb}^{slot})$. In this case, n=0, . . . , numberofrepetitions−1, S denotes a start symbol of the configured UL data channel, and L denotes a symbol length of the configured UL data channel. $K_s$ indicates a slot in which PUSCH transmission starts, and $N_{symb}^{slot}$ indicates the number of symbols per slot.

The UE determines invalid symbols for the PUSCH repetitive transmission type B. A symbol configured as DL by tdd-UL-DL-ConfigurationCommon or tdd-UL-DL-ConfigurationDedicated is determined as an invalid symbol for the PUSCH repetitive transmission type B. Furthermore, the invalid symbol may be configured in a higher layer parameter (e.g., InvalidSymbolPattern). The higher layer parameter (e.g., InvalidSymbolPattern) may provide a symbol-level bitmap spanning one or two slots to configure the invalid symbols. In the bitmap, 1 represents an invalid symbol. In addition, a period and pattern of the bitmap may be configured in a higher layer parameter (e.g., periodicity AndPattern). When the higher layer parameter (e.g., InvalidSymbolPattern) is configured and parameter InvalidSymbolPatternIndicator–ForDCIFormat0_1 or InvalidSymbolPatternIndicator–ForDCIFormat0_2 indicates 1, the UE applies an invalid symbol pattern, and when the parameter indicates 0, the UE does not apply the invalid symbol pattern. When the higher layer parameter (e.g., InvalidSymbolPattern) is configured and the parameter InvalidSymbolPatternIndicator–ForDCIFormat0_1 or InvalidSymbolPatternIndicator–ForDCIFormat0_2 is not configured, the UE applies the invalid symbol pattern.

After an invalid symbol is determined in each nominal repetition, the UE may consider other remaining symbols as valid symbols. When one or more valid symbols are included in each nominal repetition, the nominal repetition may include one or more actual repetitions. In this case, each actual repetition includes a set of consecutive valid symbols available for the PUSCH repetitive transmission type B within one slot.

Figure 3:
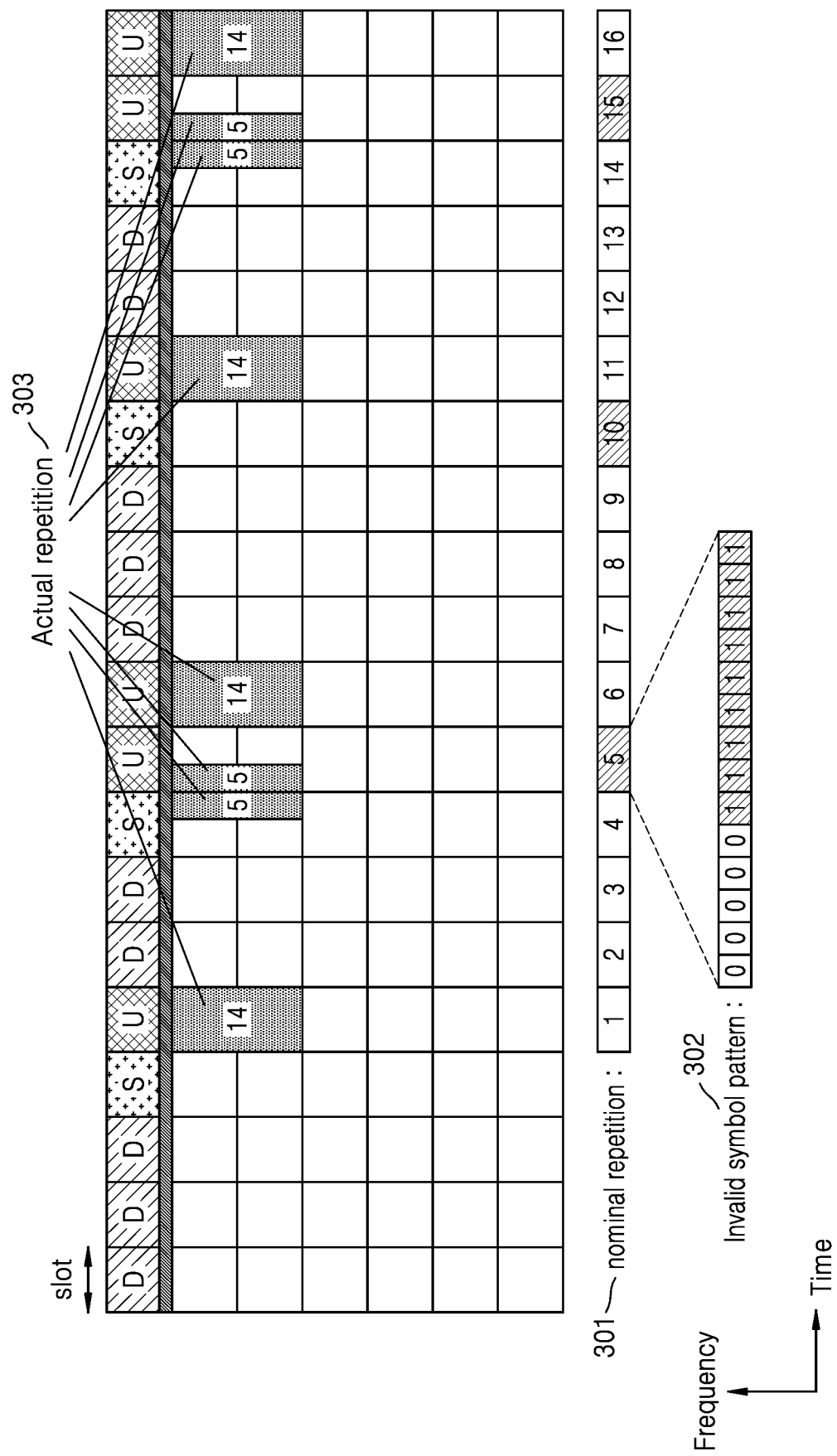
FIG. 3 is a diagram illustrating an example of a physical uplink shared channel (PUSCH) repetitive transmission type B in a 5G or NR system.

FIG. 3 is a diagram illustrating an example of the PUSCH repetitive transmission type B in the 5G or NR system.

The UE may be configured with a start symbol S (an index indicating a start symbol) of the UL data channel as 0, a length L of the UL data channel as 14, and the number of repetitive transmissions as 16. In this case, a nominal repetition 301 is shown in 16 consecutive slots. Then, the UE may determine, as invalid symbols, symbols configured as DL symbols in each nominal repetition 301. Also, the UE determines, as invalid symbols, symbols configured as 1 in an invalid symbol pattern 302. In each nominal repetition, when valid symbols, not invalid symbols, are composed of one or more consecutive symbols in one slot, the symbols are configured as an actual repetition 303 and transmitted.

A procedure for the UE to transmit or receive a UL/DL signal or channel may be largely divided into two types as follows. The UE may receive DCI transmitted through a DL control channel (e.g., a PDCCH) from the BS, and perform UL/DL transmission and reception (e.g., a PDSCH or PUSCH) according to the received DCI. In the disclosure, as described above, a method by which the UE receives DCI and performs UL/DL transmission and reception according to the received DCI is expressed as a first UL/DL transmission and reception method or a first transmission and reception type. Also, as for other UL/DL transmission and reception methods, examples of a method by which the UE may transmit or receive, to or from the BS, a UL/DL signal or channel according to transmission and reception configuration information configured through a higher layer signal or the like without separate DCI reception may include a semi-persistent scheduling (SPS) method, a grant-free (non-grant) method, or a configured grant method. In the disclosure, as described above, a method by which the UE performs UL/DL transmission and reception without receiving DCI is expressed as a second UL/DL transmission and reception method or a second transmission and reception type. In this case, second UL/DL transmission and reception performed by the UE may start after the UE receives, from the BS, DCI indicating activation of second UL/DL transmission and reception configured through a higher layer signal. If the UE receives, from the BS, DCI indicating release of the second UL/DL transmission and reception, the UE may not perform the configured second UL/DL transmission and reception. In the above method, all pieces of configuration information regarding the second transmission and reception type are received by using the higher layer signal and the DCI, and thus, the above method may be classified as a type 2 method of second transmission and reception type.

In addition, as described above, it may be determined that the second UL/DL transmission and reception is activated immediately after the UE receives the higher layer signal related to the second UL/DL transmission and reception even without separate reception of DCI for activation or release of the second UL/DL transmission and reception performed by the UE. Similarly, the BS may release the second UL/DL transmission and reception configured in the UE through reconfiguration of the higher layer signal related to the second UL/DL transmission and reception, in which case the UE may not perform the configured second UL/DL transmission and reception. In the above method, all pieces of configuration information regarding the second transmission and reception type are received only with the higher layer signal, and thus, the above method may be classified as a type 1 method of second transmission and reception type.

The second transmission and reception type is divided into DL and UL and described in more detail as follows.

The second transmission and reception type for DL is a method by which the BS periodically transmits a DL data channel to the UE based on information configured by higher layer signaling without DCI transmission. The second transmission and reception type for DL may be mainly used when transmitting Voice over Internet Protocol (VOIP) or periodically generated traffic, and the DL data channel may be transmitted without DCI transmission, such that overhead may be minimized.

The UE may receive the following configuration information for DL reception of the second transmission and reception type from the BS through a higher layer signal.
Periodicity: period of the second transmission and reception type
nrofHARQ-Processes: the number of hybrid automatic repeat request (HARQ) processes configured for the second transmission and reception type
n1PUCCH-AN: HARQ resource configuration information for transmitting a reception result for a PDSCH received as the second transmission and reception type to the BS
mcs-Table: modulation and coding scheme (MCS) table configuration information applied to transmission of the second transmission and reception type Similarly, the UE may receive the following configuration information for UL transmission of the second transmission and reception type from the BS through a higher layer signal.
frequencyHopping: a field indicating whether intra-slot hopping or inter-slot hopping is used. If this field is not present, frequency hopping is disabled.
cg-DMRS-Configuration: demodulation reference signal (DMRS) configuration information
mcs-Table: a field indicating whether a 256QAM MCS table or a new64QAM MCS table is used during PUSCH transmission without transform precoding. If this field is not present, a 64QAM MCS table is used.
mcs-TableTransformPrecoder: a field indicating an MCS table used by the UE during PUSCH transmission based on transform precoding. If this field is not present, a 64QAM MCS table is used.
uci-OnPUSCH: applies beta-offset by using either a dynamic method or a quasi-static method
resourceAllocation: configures whether a resource allocation type is 1 or 2
rbg-Size: determines one of two configurable resource block group (RBG) sizes
powerControlLoopToUse: determines whether to apply closed loop power control
p0-PUSCH-Alpha: applies P0, PUSCH alpha value
transformPrecoder: configures whether to apply transform coding. If this field is not present, msg3 configuration information is followed.
nrofHARQ-Processes: the number of configured HARQ processes
repK: the number of repetitive transmissions
repK-RV: an RV pattern applied to each repetitive transmission. If the number of repetitive transmissions is 1, this field is disabled.
periodicity: transmission period, which presents from a minimum of 2 symbols to a maximum of 640 to 5,120 slot units according to a subcarrier spacing.
configuredGrantTimer: a timer to guarantee retransmission, which is composed of a plurality of periodicity units.

In this case, in the case of type 1 among the second transmission and reception types, the UE may additionally receive the following configuration information from the BS through a higher layer signal (e.g., rrc-ConfiguredUplinkGrant). In this regard, in the case of type 2 among the second transmission and reception types, the UE may receive the following configuration information through DCI.
timeDomainOffset: a value indicating a first slot in which UL transmission of the second transmission and reception type starts, which is information in slot units based on a system frame number (SFN) 0.

timeDomainAllocation: a field indicating UL transmission time resource domain of the second transmission and reception type, which is a value of startSymbolAndLength or start and length indicator values (SLIV).

frequencyDomainAllocation: a field indicating a UL transmission frequency resource domain of the second transmission and reception type antennaPort: antenna port configuration information applied to UL transmission of the second transmission and reception type dmrs-SeqInitialization: a field configured when transform precoder is disabled precodingAndNumberOfLayers srs-ResourceIndicator: a field indicating sounding reference signal (SRS) resource configuration information mcsAndTBS: MCS and transport block size (TBS) applied to UL transmission of the second transmission and reception type frequency HoppingOffset: frequencyhoppingoffset value pathlossReferenceIndex In this case, the UE may be configured to repetitively transmit one transport block (TB) up to repK times by using the second UL transmission method. In this case, repK is a value that may be configured through a higher layer signal, and a UE in which a repK value is configured or a UE in which the repK value is configured to a value larger than 1 may repetitively transmit the TB by the repK value. In this case, in the case of a UL data channel, as in first UL transmission described above, one of two types of repetitive transmission method, i.e., the PUSCH repetitive transmission type A and the PUSCH repetitive transmission type B, may also be configured in second UL transmission. In this case, the UE may be configured with a maximum value of the repK value through a higher layer signal, and may also be able to receive repK', a value that the UE has to repetitively transmit in DCI for activating the second UL transmission method. In this regard, repK' may be less than or equal to repK. In this case, repK is the number of transmissions including an initial transmission or early transmission of a TB transmitted using the second UL transmission method, and may have one of values including 1 (e.g., repK=1, 2, 4, 8, 16). In this regard, the repK value is an example and is not limited to the above values. In this case, the UE may determine a redundancy version (RV) value for an n-th transmission among repK transmissions as a (mod(n−1,4)+1)-th value among repK-RV values, which are a configured RV sequence, wherein n=1, 2, . . . , K, and K is the number of repetitive transmissions that are actually transmitted.

Figure 4:
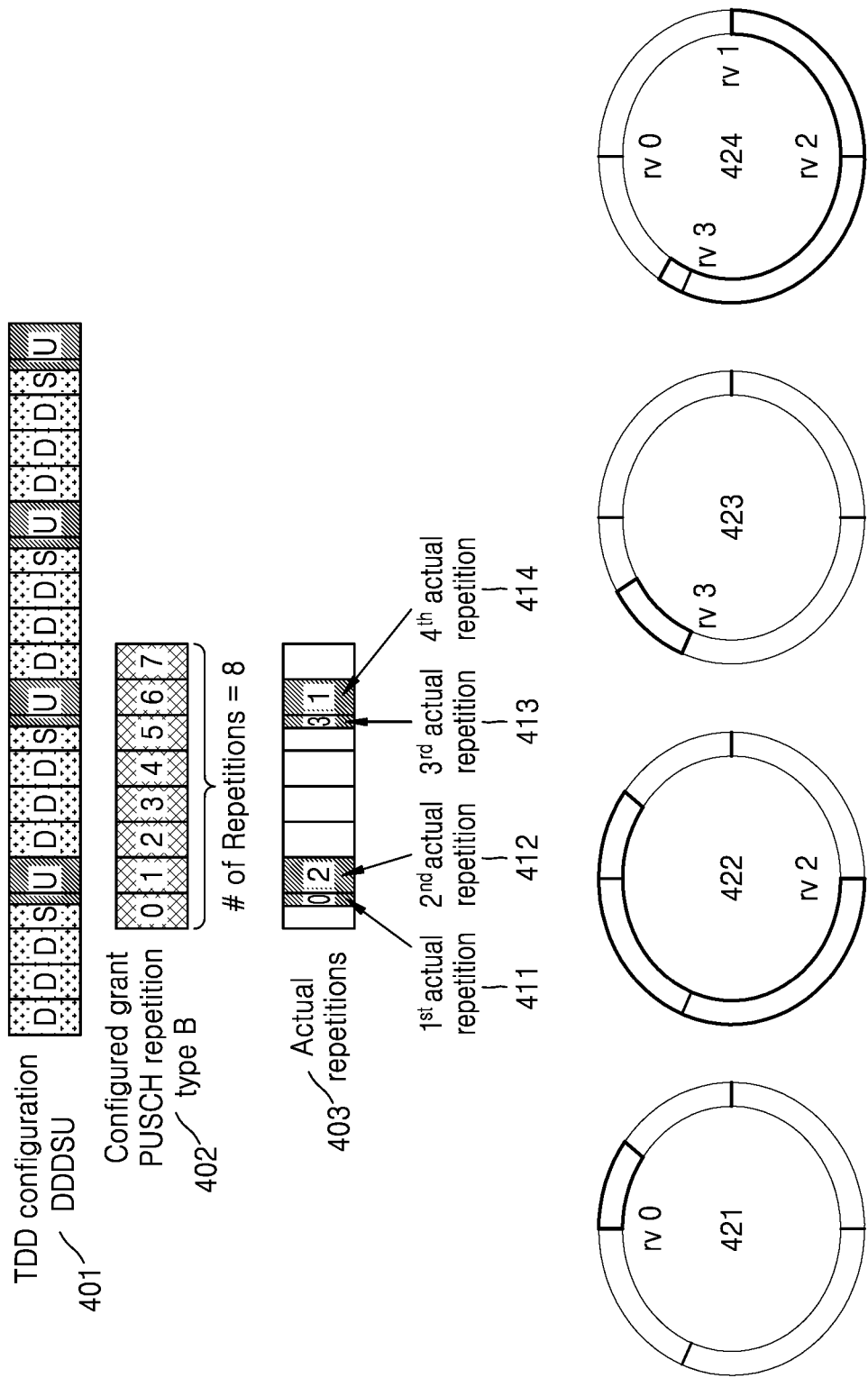
FIG. 4 is a diagram illustrating an example of a repetitive transmission type B of second uplink transmission in a time-division duplexing (TDD) system.

FIG. 4 is a diagram illustrating an example of a repetitive transmission type B of second uplink transmission in a time-division duplexing (TDD) system.

The UE may be configured with a TDD frame structure configuration of 3 DL slots, 1 special/flexible slot, and 1 UL slot. In this case, when a special/flexible slot is composed of 11 DL symbols and 3 UL symbols, in a case where an initial transmission slot is a third slot in second UL transmission, the UE is configured with an index of a start symbol of a UL data channel as 0 and a length of the UL data channel as 14, and the number of repetitive transmissions repK is 8, nominal repetition appears in 8 consecutive slots from the initial transmission slot (402). Then, the UE determines that a symbol configured as a DL symbol in a frame structure 401 of the TDD system at each nominal repetition is an invalid symbol, and when valid symbols are composed of one or more consecutive symbols in one slot, the symbols may be configured as actual repetition and transmitted (403). Accordingly, a total of repK_actual=4 PUSCHs may be actually transmitted. In this case, when repK-RV is configured as 0-2-3-1, an RV of an PUSCH actually transmitted on a first resource 411 is 0, an RV of the PUSCH actually transmitted on a second resource 412 is 2, an RV of the PUSCH actually transmitted on a third resource 413 is 3, and an RV of the PUSCH actually transmitted on a fourth resource 414 is 1. In this regard, only a PUSCH having RV values 0 and 3 may be decoded by itself. In the case of the first resource 411 and the third resource 413, the PUSCH is transmitted only on three symbols that are much less than an actually configured symbol length (14 symbols), and thus, bit lengths 421 and 423 that rate-match each other are less than bit lengths 422 and 424 calculated by configuration. In the above configuration, there may be no transmission of a PUSCH that may be decoded by itself. In this case, a gain from repetitive transmissions may not be obtained as much as possible, and reception performance may also be significantly reduced.

In the disclosure, by solving the case of reduced reception performance that may occur in the case of the PUSCH repetitive transmission type B through a method of determining an RV value in second UL repetitive transmissions, the gain from repetitive transmissions may be obtained as much as possible, and UL reception performance and UL coverage may be improved. Hereinafter, the main gist of the disclosure is now described through detailed embodiments.

First Embodiment

A first embodiment of the disclosure relates to a method of determining an RV value according to repetitive transmissions of the PUSCH actually transmitted in the PUSCH repetitive transmission type B. Through the method of determining an RV value according to the repetitive transmissions of the PUSCH actually transmitted in the PUSCH repetitive transmission type B described in the present embodiment, the gain from repetitive transmissions may be obtained as much as possible without loss.

In detail, in the case of repetitive transmission type B of the second UL transmission in the TDD system, the number of OFDM symbols of the PUSCH actually transmitted may be less than or equal to the number of OFDM symbols of the PUSCH configured for the UE by the BS, and the number of symbols may be different for each transmission. Accordingly, as described above, the RV value is configured for each repetitive transmission. Because the number of symbols is different for each repetitive transmission, the number of symbols may be different for each RV value. In this case, in the case of 0 and 3 among the RV values, when the number of OFDM symbols of the PUSCH configured for the UE by the BS is equal to the number of OFDM symbols of the actually transmitted PUSCH, only one PUSCH having RV values 0 and 3 may be decoded by itself according to characteristics of channel coding, but in the case of 1 and 2, even if the number of configured symbols is equal to the number of actually transmitted symbols, the PUSCH may not be decoded by itself. However, even if the PUSCH has RV values 0 and 3, in the case of the PUSCH repetitive transmission type B, when the number of OFDM symbols of the PUSCH configured for the UE is less than the number of OFDM symbols of the PUSCH actually transmitted, the PUSCH may lose a self-decoding characteristic, which may cause a significant performance reduction. Accordingly, when an appropriate RV value is configured for each repetitive transmission in consideration of the number of OFDM symbols of the PUSCH configured for the UE by the BS and the number of OFDM symbols of the PUSCH actually transmitted, the UL reception performance and coverage may be improved by maximizing the gain from repetitive transmissions.

Therefore, the following methods are proposed as a method of determining an RV value in consideration of the number of OFDM symbols of the PUSCH actually transmitted in the PUSCH repetitive transmission type B.

Method 1

A start point of repK-RV values, which are an RV sequence configured by RRC signaling, may be changed in consideration of the number of OFDM symbols of the PUSCH configured for the UE by the BS and the number of OFDM symbols of the PUSCH actually transmitted in the PUSCH repetitive transmission type B. As described above, in the case of the second UL transmission, the repK-RV values, which are the RV sequence configured by RRC signaling, start in a first PUSCH during repetitive transmissions of the PUSCH actually transmitted in the PUSCH repetitive transmission type B. In this case, because the number of OFDM symbols of the first PUSCH may be small in the repetitive transmissions of the PUSCH actually transmitted, a performance reduction may be caused as described above. Accordingly, the UE determines an RV value for an n-th transmission among repK transmissions as a (mod(n−$N_{start}$, $N_{length}$)+1)-th value among the repK-RV values, which are the configured RV sequence, wherein n=1, 2, . . . , K, and K is the number of repetitive transmissions that are actually transmitted. $N_{length}$ may be a length of the RV sequence configured by RRC signaling. $N_{start}$ may be determined in consideration of the number of OFDM symbols of the PUSCH configured for the UE by the BS and the number of OFDM symbols of the PUSCH actually transmitted. In this case, $N_{start}$ may be determined by using the following method.

Method 1-1

Nstart may be determined, among the number of actual repetitive transmissions repK_actual, as an index of a PUSCH in which the number of OFDM symbols of a PUSCH configured for the UE by the BS is first equal to the number of OFDM symbols of the PUSCH actually transmitted. If there is no PUSCH in which the number of OFDM symbols of the PUSCH configured for the UE by the BS is equal to the number of OFDM symbols of the PUSCH actually transmitted, an Nstart value may be configured to 1.

Figure 5:
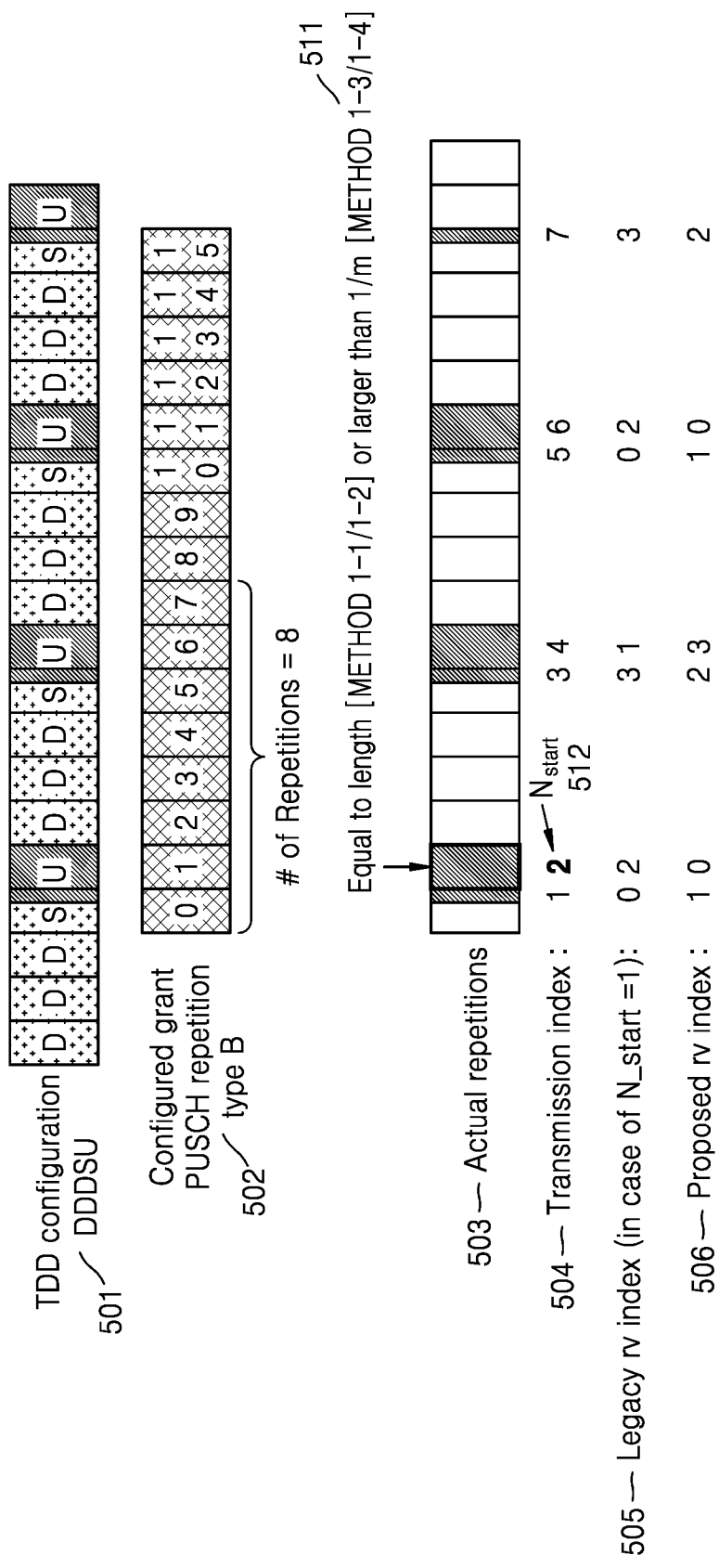
FIG. 5 is a diagram illustrating a method of determining redundancy version (RV) values of repetitively transmitted PUSCHs, according to an embodiment of the disclosure.

FIG. 5 is a diagram illustrating a method of determining RV values of repetitively transmitted PUSCHs, according to an embodiment of the disclosure.

Referring to FIG. 5, a TDD frame structure configuration 501 may be configured as 3 DL slots, 1 special/flexible slot, and 1 UL slot. In this case, when a special/flexible slot is composed of 11 DL symbols and 3 UL symbols, in a case where an initial transmission slot is a third slot in the second UL transmission, the UE is configured with an index of a start symbol of the UL data channel as 0 and a length of the UL data channel as 14, and the number of repetitive transmissions repK=16 (502), as for the repetitive transmissions of the PUSCH actually transmitted, a total of repK_actual=7 (503) may be transmitted. In this regard, because a first PUSCH among PUSCHs that are actually transmitted is transmitted on symbol 3, the first PUSCH is not considered in determining Nstart, and because a second PUSCH is actually transmitted on symbol 14 configured by the BS (511), Nstart=2 (512) is configured. In the case of legacy Nstart=1 in the above configuration (505), only an RV value of 0 or 3 is transmitted in the PUSCH transmitted on the symbol 3, and only an RV value of 2 or 1 is transmitted in the PUSCH transmitted on the symbol 14. However, when $N_{start}$ is configured to 2 by the above method (506), the RV value is configured to 2 or 1 in the PUSCH transmitted on the symbol 3, and the RV value is configured to 0 or 3 in the PUSCH transmitted on the symbol 14. Accordingly, the RV value 0 or 3 may be configured in the PUSCH in which the number of OFDM symbols of the PUSCH configured for the UE is equal to the number of OFDM symbols of the PUSCH actually transmitted, which may prevent the PUSCH from losing the self-decoding characteristic. Therefore, the gain from repetitive transmissions may be obtained as much as possible without loss.

Method 1-2

$N_{start}$ may be determined, among the number of actual repetitive transmissions repK_actual, as an index of a PUSCH in which the number of OFDM symbols of the PUSCH configured for the UE by the BS is first equal to the number of OFDM symbols of the PUSCH actually transmitted. If there is no PUSCH in which the number of OFDM symbols of the PUSCH configured for the UE by the BS is equal to the number of OFDM symbols of the PUSCH actually transmitted, RV values of all repetitively transmitted PUSCHs may be configured to 0 regardless of the repK-RV values, which are the RV sequence configured by RRC signaling.

Method 1-3

$N_{start}$ may be determined, among the number of actual repetitive transmissions repK_actual, as an index 512 of a PUSCH in which the number of OFDM symbols of a PUSCH actually transmitted first is larger than or equal to 1/m (511) of the number of OFDM symbols of the PUSCH configured for the UE by the BS. As described above, even if the PUSCH has RV values 0 and 3, in the case of the PUSCH repetitive transmission type B, when the number of OFDM symbols of the PUSCH configured for the UE is less, by a certain value, than the number of OFDM symbols of the PUSCH actually transmitted, the PUSCH may lose the self-decoding characteristic, which may cause a significant performance reduction. In this case, when the number of OFDM symbols of the PUSCH actually transmitted is larger than or equal to 1/m of the number of the OFDM symbols of the PUSCH configured for the UE by the BS, the PUSCH may be decoded by itself. In this case, an m value may be 1, 2, 3, 4, . . . , 14, and may be configured by RRC signaling, or in the case of type 2 among the second transmission and reception types, may be configured through DCI. If there is no PUSCH in which the number of OFDM symbols of the PUSCH actually transmitted is larger than or equal to 1/m of the number of the OFDM symbols of the PUSCH configured for the UE by the BS, an $N_{start}$ value may be configured to 1.

Method 1-4

$N_{start}$ may be determined, among the number of actual repetitive transmissions repK_actual, as an index 512 of a PUSCH in which the number of OFDM symbols of the PUSCH actually transmitted first is larger than or equal to 1/m (511) of the number of OFDM symbols of the PUSCH configured for the UE by the BS. As described above, even if the PUSCH has RV values 0 and 3, in the case of the PUSCH repetitive transmission type B, when the number of OFDM symbols of the PUSCH configured for the UE is less, by a certain value, than the number of OFDM symbols of the PUSCH actually transmitted, the PUSCH may lose the self-decoding characteristic. In this case, a significant performance reduction may be caused. When the number of OFDM symbols of the PUSCH actually transmitted is larger than or equal to 1/m of the number of the OFDM symbols of the PUSCH configured for the UE by the BS, the PUSCH may be decoded by itself. In this case, the m value may be 1, 2, 3, 4, . . . , 14, and may be configured by RRC signaling, or in the case of type 2 among the second transmission and reception types, may be configured through DCI. If there is no PUSCH in which the number of OFDM symbols of the PUSCH actually transmitted is larger than or equal to 1/m of the number of the OFDM symbols of the PUSCH configured for the UE by the BS, RV values of all the repetitively transmitted PUSCHs may be configured to 0 regardless of the repK-RV values, which are the RV sequence configured by RRC signaling.

According to the above methods, by configuring an appropriate RV value by changing the start point of the repK-RV values, which are the RV sequence configured by RRC signaling, in consideration of the number of OFDM symbols of the PUSCH configured for the UE by the BS and the number of OFDM symbols of the PUSCH actually transmitted in the PUSCH repetitive transmission type B, the UL reception performance and the UL coverage may be improved.

Method 2

In the PUSCH repetitive transmission type B, in consideration of the number of OFDM symbols of the PUSCH configured for the UE by the BS and the number of OFDM symbols of a first PUSCH among PUSCHs that are actually repetitively transmitted, RV values of all the repetitively transmitted PUSCHs may be configured to 0 regardless of the repK-RV values, which are the RV sequence configured by RRC signaling. As described above, in the case of the second UL transmission, the repK-RV values, which are the RV sequence configured by RRC signaling, start in a first PUSCH during repetitive transmissions of the PUSCH actually transmitted in the PUSCH repetitive transmission type B. In this case, because the number of OFDM symbols of the first PUSCH may be small in the repetitive transmissions of the PUSCH actually transmitted, a performance reduction may be caused as described above. Accordingly, the UE may configure the RV values of all the repetitively transmitted PUSCHs to 0 regardless of the repK-RV value under the following conditions.

Condition 1

Figure 6:
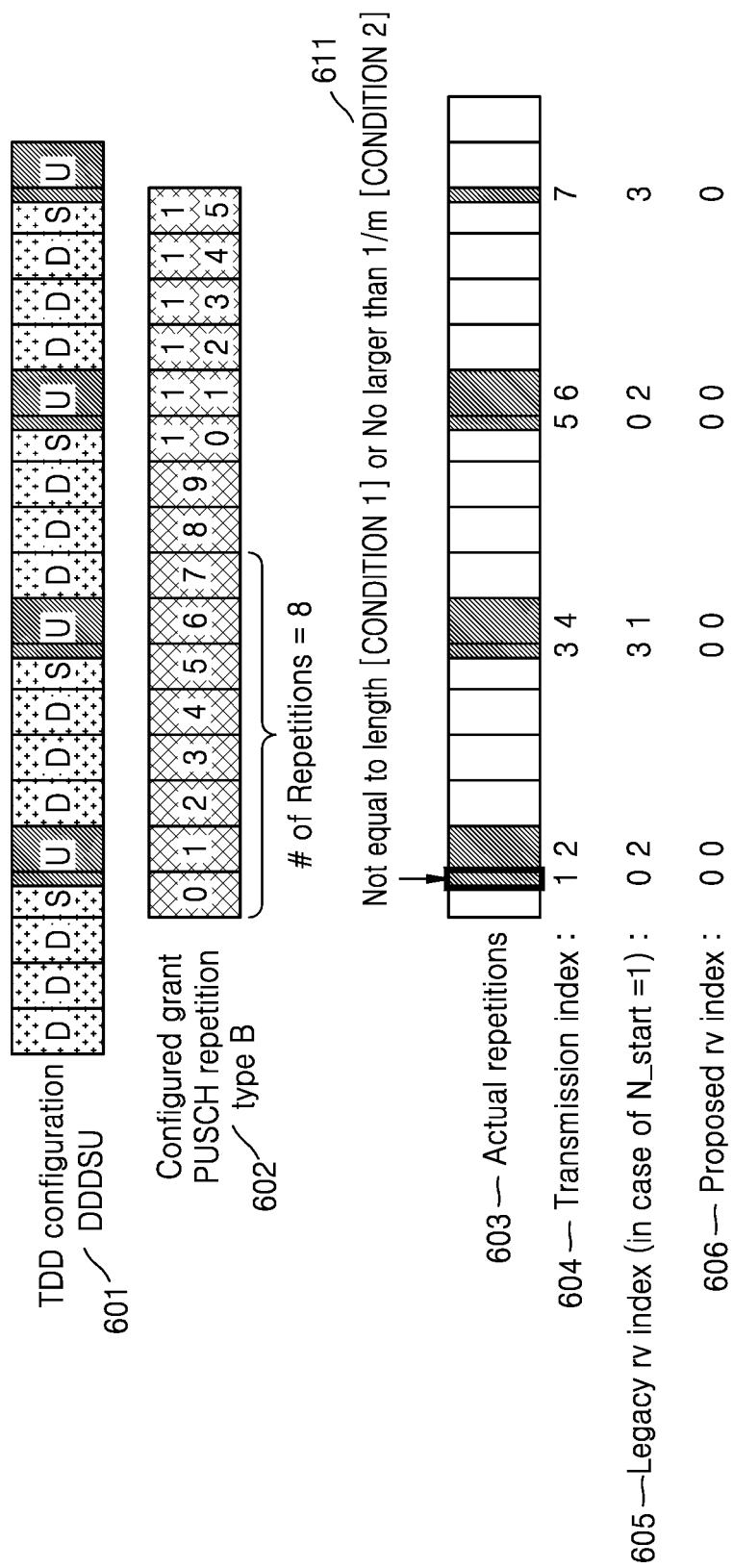
FIG. 6 is a diagram illustrating another method of determining RV values of repetitively transmitted PUSCHs, according to an embodiment of the disclosure.

FIG. 6 is a diagram illustrating another method of determining RV values of repetitively transmitted PUSCHs, according to an embodiment of the disclosure.

When the number of OFDM symbols of the PUSCH configured for the UE by the BS is not equal to the number of OFDM symbols of the PUSCH actually transmitted, RV values of all the repetitively transmitted PUSCHs may be configured to 0 regardless of the repK-RV values that may be configured by RRC signaling. Referring to FIG. 6, a TDD frame structure configuration 601 may be configured as 3 DL slots, 1 special/flexible slot, and 1 UL slot. In this case, when a special/flexible slot is composed of 11 DL symbols and 3 UL symbols, in a case where an initial transmission slot is a third slot in the second UL transmission, the UE is configured with an index of a start symbol of the UL data channel as 0 and a length of the UL data channel as 14, and the number of repetitive transmissions repK=16 (602), as for the repetitive transmissions of the PUSCH actually transmitted, a total of repK_actual=7 (603) may be transmitted. In this regard, because the first PUSCH among the PUSCHs that are actually transmitted is transmitted on symbol 3, according to (Condition 1), the RV values of all the repetitively transmitted PUSCHs are configured to 0 regardless of the repK-RV values configured by RRC signaling (606).

Condition 2

When the number of OFDM symbols of the first PUSCH actually transmitted is not larger than or equal to 1/m (611) of the number of OFDM symbols of the PUSCH configured for the UE by the BS, the RV values of all the repetitively transmitted PUSCHs may be configured to 0 regardless of the repK-RV value that may be configured by RRC signaling. As described above, even if the PUSCH has RV values 0 and 3, in the case of the PUSCH repetitive transmission type B, when the number of OFDM symbols of the PUSCH configured for the UE is less, by a certain value, than the number of OFDM symbols of the PUSCH actually transmitted, the PUSCH may lose the self-decoding characteristic, which may cause a significant performance reduction. When the number of OFDM symbols of the PUSCH actually transmitted is larger than or equal to 1/m of the number of the OFDM symbols of the PUSCH configured for the UE by the BS, the PUSCH may be decoded by itself. In this case, the m value may be 1, 2, 3, 4, . . . , 14, and may be configured by RRC signaling, or in the case of type 2 among the second transmission and reception types, may also be configured through DCI. Therefore, when the number of OFDM symbols of the PUSCH actually transmitted first is not larger than or equal to 1/m (611) of the number of OFDM symbols of the PUSCH configured for the UE by the BS, the PUSCH may lose the self-decoding characteristic, and thus, the performance reduction may be prevented by configuring the RV values of all the repetitively transmitted PUSCHs to 0.

Method 3

An RV value may be determined in consideration of the number of OFDM symbols of the PUSCH actually transmitted in the PUSCH repetitive transmission type B. In detail, in the case of type 2 among the second transmission and reception types, a starting RV value of a first PUSCH in repetitive transmissions of the PUSCH actually transmitted may be configured based on a frame structure of the TDD system, which is configured for the UE by the BS through DCI, a period of the second UL transmission, and the number of repetitive transmissions.

Method 4

An RV value may be determined in consideration of the number of OFDM symbols of the PUSCH actually transmitted in the PUSCH repetitive transmission type B. In detail, by re-analyzing the repK-RV values, which are the RV sequence configured by RRC signaling, based on the frame structure of the TDD system, which is configured for the UE by the BS, the period of the second UL transmission, and the number of repetitive transmissions, an RV value of each PUSCH actually transmitted may be configured.

Figure 7:
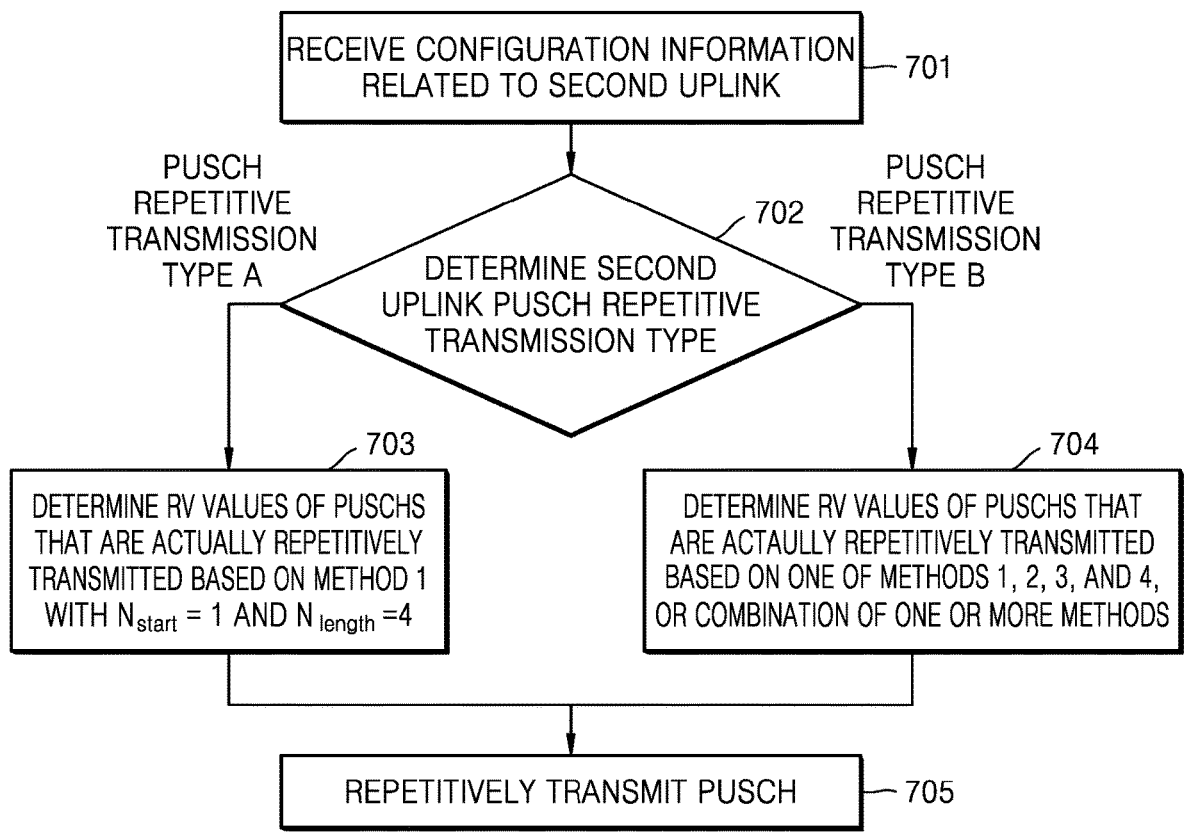
FIG. 7 is a flowchart for describing operations of a terminal for determining RV values of repetitively transmitted PUSCHs, according to an embodiment of the disclosure.

FIG. 7 is a flowchart for describing operations of the UE for determining RV values of repetitively transmitted PUSCHs, according to an embodiment of the disclosure.

Referring to FIG. 7, the UE may receive configuration information related to a second UL from the BS (701). The reception may be performed through a higher layer signal or L1 signaling, and the configuration information may include at least one of a period of second UL transmission, the number of repetitive transmissions, and a repetitive transmission type.

The UE may determine the repetitive transmission type among pieces of information related to the second UL (702). In this case, the repetitive transmission type may be configured only with the higher layer signal, or a type configured in the higher layer signal may be changed through L1 signaling. For example, in a case where the repetitive transmission type is configured to A in the higher layer signal, when there is no configuration in the L1 signaling, the UE may determine the repetitive transmission type as A, and when the repetitive transmission type is configured to B in the L1 signaling, the repetitive transmission type A configured in the higher layer signal may be changed to B.

When the UE determines the repetitive transmission type of the second UL as A, the presence of a valid resource and whether a second UL PUSCH may be transmitted may be identified through at least one piece of information among a previously configured frame structure of the TDD system, slot format indicator information, the number of repetitive transmissions, a starting slot and symbol of the second UL PUSCH, and PUSCH symbol length information. Then, when $N_{start}=1$ and $N_{length}=4$, the UE may determine an RV value for an n-th transmission among the number of repetitive transmissions that are actually transmitted on a valid resource by using Method 1 described above (703). That is, the RV value for the n-th transmission among the number of repetitive transmissions that are actually transmitted on the valid resource is determined as a $(\mod(n-1,4)+1)$-th value from among repK-RV values, which are a configured RV sequence. In this regard, n=1, 2, . . . , K, and K is the number of repetitive transmissions that are actually transmitted.

When the UE determines the repetitive transmission type of the second UL as B, the presence of a valid resource and whether a second UL PUSCH may be transmitted may be identified through at least one piece of information among the previously configured frame structure of the TDD system, the slot format indicator information, the number of repetitive transmissions, the starting slot and symbol of the second UL PUSCH, and the PUSCH symbol length information. Then, the UE may determine the RV value for the n-th transmission among the number of repetitive transmissions that are actually transmitted on the valid resource by using one of (Method 1) to (Method 4) described above or by using a combination of methods (704).

Finally, the UE may transmit the second UL PUSCH based on the determined RV value (705).

The above embodiment relates to the second UL transmission, and is merely illustrative of specific examples to easily facilitate description and understanding of the disclosure, and is not intended to limit the scope of the disclosure. That is, it will be obvious to those of ordinary skill in the art that the technical concept of the disclosure can also be implemented on first UL transmission and first/second UL reception.

Figure 8:
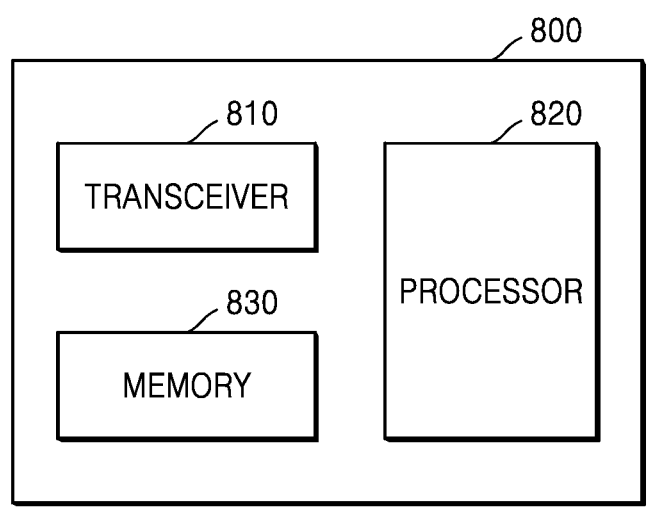
FIG. 8 is a block diagram of a terminal according to an embodiment of the disclosure.

FIG. 8 is a block diagram of a UE according to an embodiment of the disclosure.

Referring to FIG. 8, a UE 800 may include a transceiver 810, a controller (processor) 820, and a storage (memory) 830. According to an efficient channel and signal transmission/reception method in the 5G communication system corresponding to the aforementioned embodiments, the transceiver 810, the controller 820, and the storage 830 of the UE 800 may operate. However, elements of the UE 800 according to an embodiment are not limited to the aforementioned examples. According to another embodiment, the UE 800 may include more elements than the aforementioned elements or may include fewer elements. Moreover, in a specific case, the transceiver 810, the controller 820, and the storage 830 may be implemented as a single chip.

According to another embodiment, the transceiver 810 may also include a transmitter and a receiver. The transceiver 810 may transmit or receive a signal to or from the BS. The signal may include control information and data. For this, the transceiver 810 may include an RF transmitter for up-converting the frequency of a signal to be transmitted and amplifying the signal and an RF receiver for low-noise amplifying a received signal and down-converting the frequency of the received signal. Furthermore, the transceiver 810 may receive a signal through a wireless channel, output the received signal to the controller 820, and transmit a signal output from the controller 820 through a wireless channel.

The controller 820 may control a series of processes to allow the UE 800 to operate according to the aforementioned embodiments of the disclosure. For example, the controller 820 may perform at least one of a method of determining a repetitive transmission type in a second UL PUSCH repetitive transmission configuration and a method of determining RV values of PUSCHs that are actually repetitively transmitted, according to the embodiments of the disclosure. The storage 830 may store control information or data, such as frequency hopping information, information associated with simultaneous channel estimation based on DMRSs transmitted in a plurality of TTIs, or the like, which are included in a signal obtained by the UE 800, and may have an area for storing data required for control by the controller 820 and data generated during control by the controller 820.

Figure 9:
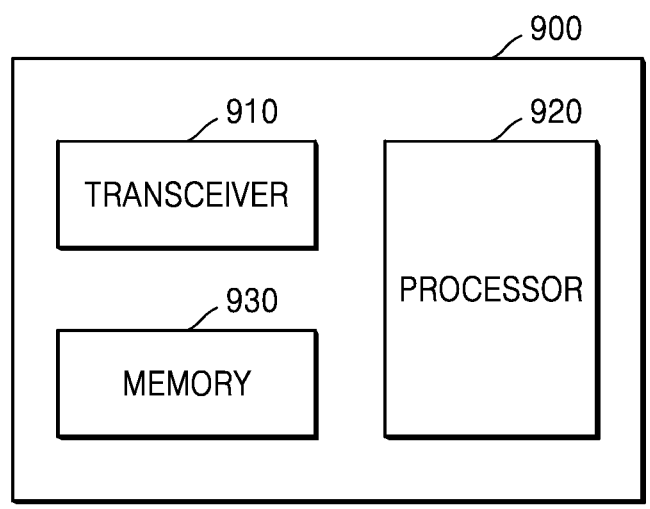
FIG. 9 is a block diagram of a base station according to an embodiment of the disclosure.

FIG. 9 is a block diagram of a BS according to an embodiment.

Referring to FIG. 9, a BS 900 may include a transceiver 910, a controller (processor) 920, and a storage (memory) 930. According to an efficient channel and signal transmission/reception method in the 5G communication system corresponding to the aforementioned embodiments, the transceiver 910, the controller 920, and the storage 930 of the BS 900 may operate. However, elements of the BS 900 according to an embodiment are not limited to the aforementioned examples. According to another embodiment, the BS 900 may include more elements than the aforementioned elements or may include fewer elements. Moreover, in a specific case, the transceiver 910, the controller 920, and the storage 930 may be implemented as a single chip. According to another embodiment, the transceiver 910 may also include a transmitter and a receiver. The transceiver 910 may transmit or receive a signal to or from the UE. The signal may include control information and data. For this, the transceiver 910 may include an RF transmitter for up-converting the frequency of a signal to be transmitted and amplifying the signal and an RF receiver for low-noise amplifying a received signal and down-converting the frequency of the received signal. Furthermore, the transceiver 910 may receive a signal through a wireless channel, output the received signal to the controller 920, and transmit a signal output from the controller 920 through a wireless channel.

The controller 920 may control a series of processes to allow the BS 900 to operate according to the aforementioned embodiments of the disclosure. For example, the controller 920 may perform at least one of the method of determining a repetitive transmission type in a second UL PUSCH repetitive transmission configuration and the method of determining RV values of PUSCHs that are actually repetitively transmitted, according to the embodiments of the disclosure.

The storage 930 may store control information or data, such as frequency hopping information, information associated with simultaneous channel estimation based on DMRSs transmitted in a plurality of TTIs, or the like, which are determined by the BS 900, or control information or data received from the UE, and may have an area for storing data required for control by the controller 920 and data generated during control by the controller 920.

Moreover, the embodiments of the disclosure described with reference to the present specification and the drawings are merely illustrative of specific examples to easily facilitate description and understanding of the disclosure, and are not intended to limit the scope of the disclosure. In other words, it is obvious to those of ordinary skill in the art that other modifications based on the technical concept of the disclosure can be implemented. Also, the embodiments of the disclosure may be combined to be implemented, when required.

The invention claimed is:

1. An operating method of a terminal in a wireless communication system, the operating method comprising:
   receiving, from a base station, configuration information for repetitive transmissions of uplink data;
   determining a value of $N_{start}$ as one of transmission indexes for the repetitive transmissions of the uplink data by comparing a number of orthogonal frequency division multiplexing (OFDM) symbols of the uplink data with a number of OFDM symbols configured by the base station, based on the configuration information;
   determining a redundancy version (RV), among RVs in a RV sequence, based on $\mathrm{mod}(n-N_{start}, N_{length})+1$, wherein the $N_{length}$ is a length of the RV sequence; and
   transmitting the uplink data based on the determined RV.

2. The operating method of claim 1, wherein the $N_{start}$ is determined as a transmission index, among the transmission indexes, in which the number of OFDM symbols configured by the base station is first equal to the number of OFDM symbols of the uplink data.

3. The operating method of claim 2, wherein, in case that there is no transmission index in which the number of OFDM symbols configured by the base station is equal to the number of OFDM symbols of the uplink data, the $N_{start}$ is configured to 1.

4. The operating method of claim 2, wherein, in case that there is no transmission index in which the number of OFDM symbols configured by the base station is equal to the number of OFDM symbols of the uplink data, all RV values of the uplink data are configured to 0.

5. The operating method of claim 1,
   wherein the $N_{start}$ is determined as a transmission index, among the transmission indexes, in which the number of OFDM symbols of the uplink data is first greater than or equal to 1/m of the number of OFDM symbols configured by the base station, and
   wherein the m is one of numbers from 1 to 14 configured by RRC signaling or configured by DCI.

6. The operating method of claim 5, wherein in case that there is no transmission index in which the number of OFDM symbols of the uplink data is greater than or equal to 1/m of the number of OFDM symbols configured by the base station, all RV values of the uplink data are configured to 0.

7. A terminal in a wireless communication system, the terminal comprising:
   a transceiver; and
   at least one processor, coupled with the transceiver and configured to:
      receive, from a base station, configuration information for repetitive transmissions of uplink data,
      determine a value of $N_{start}$ as one of transmission indexes for the repetitive transmissions of the uplink data by comparing a number of orthogonal frequency division multiplexing (OFDM) symbols of the uplink data with a number of OFDM symbols configured by the base station, based on the configuration information,
      determine a redundancy version (RV), among RVs in a RV sequence, based on $\mathrm{mod}(n-N_{start}, N_{length})+1$, wherein the $N_{length}$ is a length of the RV sequence, and
      transmit the uplink data based on the determined RV.

8. The terminal of claim 7, wherein the $N_{start}$ is determined as a transmission index, among the transmission indexes, in which the number of OFDM symbols configured by the base station is first equal to the number of OFDM symbols of the uplink data.

9. The terminal of claim 8, wherein, in case that there is no transmission index in which the number of OFDM symbols configured by the base station is equal to the number of OFDM symbols of the uplink data, the $N_{start}$ is configured to 1.

10. The terminal of claim 8, wherein, in case that there is no transmission index in which the number of OFDM symbols configured by the base station is equal to the number of OFDM symbols of the uplink data, all RV values of the uplink data are configured to 0.

11. The terminal of claim 7,
    wherein the $N_{start}$ is determined as a transmission index, among the transmission indexes, in which the number of OFDM symbols of the uplink data is first greater than or equal to 1/m of the number of OFDM symbols configured by the base station, and
    wherein the m is one of numbers from 1 to 14 configured by RRC signaling or configured by DCI.

12. The terminal of claim 11, wherein, in case that there is no transmission index in which the number of OFDM symbols of the uplink data is greater than or equal to 1/m of the number of OFDM symbols configured by the base station, all RV values of the uplink data are configured to 0.

13. An operating method of a base station in a wireless communication system, the operating method comprising:
    transmitting, to a terminal, configuration information for repetitive transmissions of uplink data; and
    receiving the uplink data based on a redundancy version (RV), among RVs in a RV sequence,
    wherein the RV is determined based on $\mathrm{mod}(n-N_{start}, N_{length})+1$,
    wherein the $N_{length}$ is a length of the RV sequence, and
    wherein a value of the $N_{start}$ is determined as one of transmission indexes for the repetitive transmissions of the uplink data by comparing a number of orthogonal frequency division multiplexing (OFDM) symbols of the uplink data with a number of OFDM symbols configured by the base station, based on the configuration information.

14. A base station in a wireless communication system, the base station comprising:
    a transceiver; and
    at least one processor coupled with the transceiver and configured to:
       transmit, to a terminal, configuration information for repetitive transmissions of uplink data, and
       receive the uplink data based on a redundancy version (RV), among RVs in a RV sequence,
    wherein the RV is determined based on $\mathrm{mod}(n-N_{start}, N_{length})+1$,
    wherein the $N_{length}$ is a length of the RV sequence, and
    wherein a value of the $N_{start}$ is determined as one of transmission indexes for the repetitive transmissions of the uplink data by comparing a number of orthogonal frequency division multiplexing (OFDM) symbols of the uplink data with a number of OFDM symbols configured by the base station, based on the configuration information.

* * * * *